United States Patent [19]

Giovengo, Jr.

[11] Patent Number: 4,747,228
[45] Date of Patent: May 31, 1988

[54] FISHING LURE

[76] Inventor: Johnnie Giovengo, Jr., P.O. Box 513, Loving, N. Mex. 88256

[21] Appl. No.: 40,630

[22] Filed: Apr. 20, 1987

[51] Int. Cl.$^4$ ............................................. A01K 85/00
[52] U.S. Cl. .................................. 43/42.31; 43/42.37; 43/42.42
[58] Field of Search ................ 43/42.31, 42.28, 42.37, 43/42.4, 42.42, 43.2, 43.6, 42.25

[56] References Cited

U.S. PATENT DOCUMENTS

| | | | |
|---|---|---|---|
| 2,488,678 | 11/1949 | Nardi | 43/42.31 |
| 2,718,725 | 9/1955 | Thurman | 43/42.31 |
| 2,738,610 | 3/1956 | Rice | 43/42.31 |
| 3,191,336 | 6/1965 | Cordell | 43/42.28 |
| 3,807,079 | 4/1974 | Goforth | 43/43.6 |
| 3,935,660 | 2/1976 | Plew | 43/42.31 |
| 4,203,246 | 5/1980 | Sacharnoski | 43/42.31 |

Primary Examiner—Gene P. Crosby
Attorney, Agent, or Firm—Warren B. Kice

[57] ABSTRACT

A fishing lure assembly in which at least one steel ball, or like structure, is moveable in a closed, hollow container, and the container is disposed in a proximate relationship to a hook so that when the assembly is moved through water, the movement of the steel balls in the cylinder generates a noise that attracts the fish.

11 Claims, 1 Drawing Sheet

FISHING LURE

BACKGROUND OF THE INVENTION

This invention relates to a fishing lure and, more particularly, to a fishing lure for attracting fish by its physical appearance and by self-generated noise.

Various types of fishing lures are on the market and are fabricated of a variety of materials and colors in many sizes and shapes, all for the purpose of attracting fish. However, it has been discovered that one of the main attractions to a fish, especially certain species such as bass, or the like, is noise, and very few, if any, of the currently available fishing lures generate any type of noise.

OBJECT OF THE INVENTION

It is therefore an object of the present invention to provide a fishing lure which attracts fish both by its physical appearance and self-generated noise.

It is a further object of the present invention to provide a fishing lure of the above type which is simple in design, easy to fabricate, and relatively inexpensive in cost.

Toward the fulfillment of these and other objects, the fishing lure of the present invention includes one or more members which move in a container to generate a noise when the lure assembly is moved in water. A hook is provided adjacent the container for catching the attracted fish.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
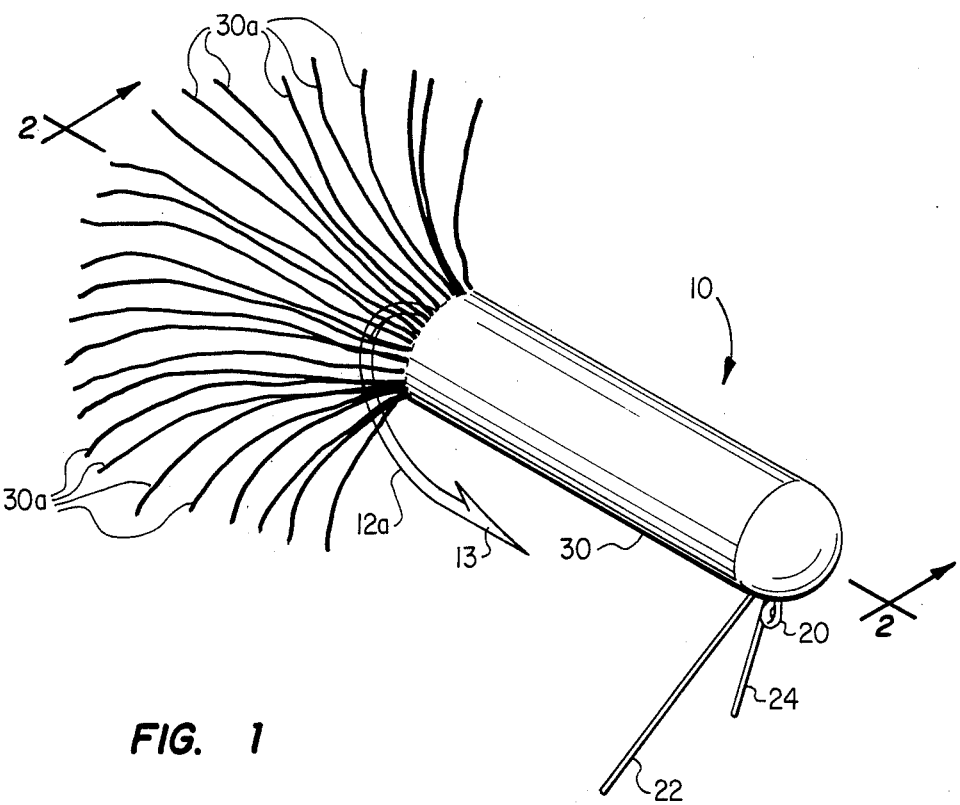
FIG. 1 is a perspective view of the fishing lure of the present invention.
Figure 2:
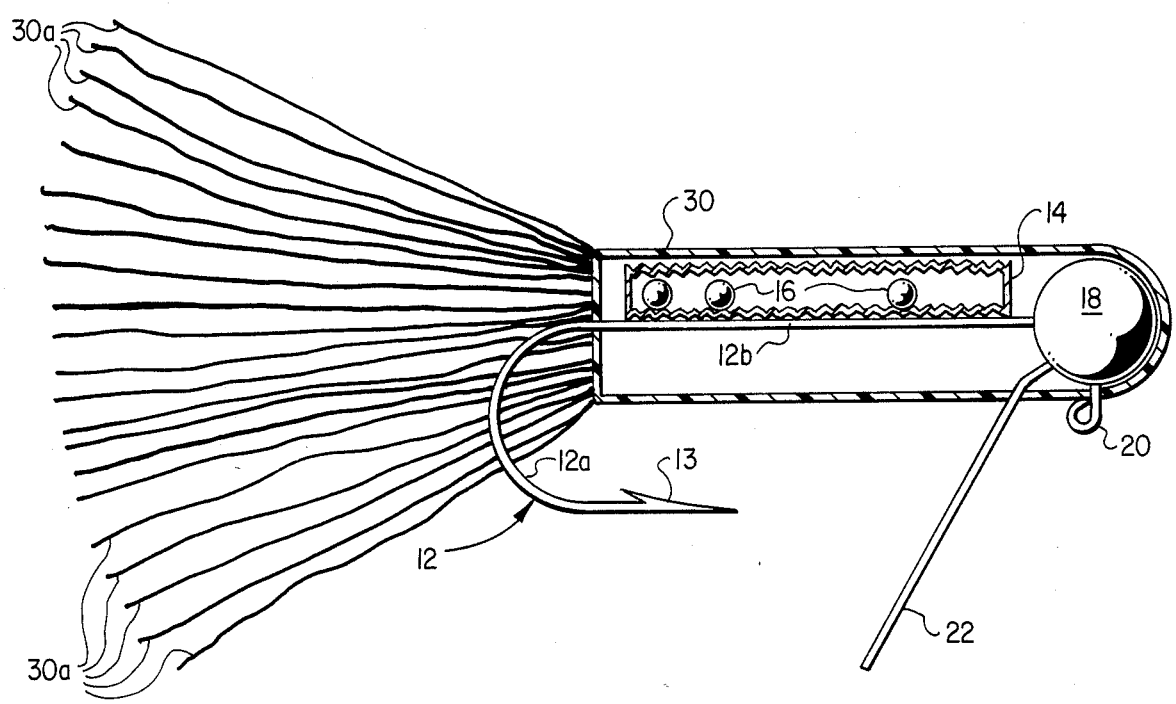
FIG. 2 is a cross-sectional view taken along the lines 2—2 of FIG. 1.

Referring specifically to FIGS. 1 and 2 of the drawings, the reference numeral 10 refers, in general, to the fishing lure of the present invention which includes a hook member 12 which has a bent portion 12a and a straight portion 12b. A barb 13 is formed on the end of the bent portion 12a in a conventional manner.

A closed, hollow cylinder 14, preferably of a plastic material, is provided parallel to and immediately adjacent the straight portion 12b of the hook 12. The cylindrical wall of the cylinder 14 is corrugated to provide a roughened surface for reasons to be described.

Three steel balls 16 are disposed in the cylinder 14 and together extend for only a fraction of the length of the cylinder 14, while having an outer diameter only slightly less than the inner diameter of the cylinder. As a result, the balls can move longitudinally back and forth within the cylinder 14 with considerable freedom while maintaining engagement with the inner surface of the corrugated cylindrical wall of the cylinder to generate noise.

A spherical weight 18 is attached to the free-end portion of the straight portion 12b of the hook, and an eyelet 20 is affixed to and extends downwardly from the weight 18. A pair of elongated rod-like members 22 and 24 are also affixed to the weight 18 and extend therefrom substantially perpendicular to the cylinder 14 to prevent the line 10 from being tangled in weeds or the like.

A flexible cover, or sock 30 extends around the assembly thus formed with the eyelet 20, the two rod-like members 22 and 24 and the bent portion 12a of the hook 12 extending through, and projecting from, the sock. According to a preferred embodiment, the sock 30 is fabricated from a resilient, rubber-like, material which encapsulates the components in the manner shown. A plurality of tail members 30a extend from the sock 30 and are flexible so that they wiggle during movement of the lure 10 through the water.

In operation, a fishing line is attached to the eyelet 20 and the lure is cast into the water and moved in the water by the fisherman. This movement causes the steel balls 16 to move longitudinally back and forth in the interior of the cylinder 14 while maintaining substantial contact against the inner surface of the corrugated wall of the cylinder and against each other. This movement of the steel balls along the roughened surface generates a noise which, when combined with the attractiveness of the lure, provides a considerable attraction to the fish.

It is understood that several modifications can be made in the foregoing without departing from the scope of the invention. For example, the materials used in the various components of the fishing lure of the present invention can be varied without departing from the scope of the invention.

Other modifications, changes and substitutions are intended in the foregoing disclosure and, in some instances, some features of the invention can be employed without a corresponding use of other features. Accordingly, it is appropriate that the appended claims be construed broadly and in a manner consistent with the scope of the invention therein.

What is claimed is:

1. A fishing lure assembly comprising a hook, a closed hollow cylinder disposed adjacent said hook having a cylindrical inner wall and two end portions, said cylindrical inner wall being roughened along its entire length, and at least one member disposed in said cylinder and adapted to move in said cylinder to generate a noise when the lure assembly is moved in water to attract fish to said hook.

2. The assembly of claim 1 wherein said moveable member is a steel ball.

3. The assembly of claim 2 wherein there are a plurality of steel balls disposed in said cylinder and wherein the volume of said cylinder exceeds the combined volume of said steel balls to permit movement of said steel balls longitudinally back and forth in said cylinder.

4. The assembly of claim 1 wherein the diameters of said steel balls are slightly less than the inner diameter of said cylinder so that said balls maintain contact with said roughened surface of said wall during their movement in said cylinder.

5. The assembly of claim 1 wherein said hook has a bent portion, a straight portion, and a barb disposed at the end of said bent portion.

6. The assembly of claim 5 further comprising a weight affixed to the free end of said straight portion of said hook.

7. The assembly of claim 6 further comprising means extending from said weight for receiving a fishing line.

8. The assembly of claim 6 further comprising weed guard means extending from said weight.

9. The assembly of claim 5 wherein said straight portion of said hook extends parallel to said cylinder.

10. The assembly of claim 5 further comprising a flexible cover extending over said cylinder and said straight portion of said hook in a manner to secure them relative to each other.

11. The assembly of claim 1 wherein said inner wall is corrugated for its entire length to form said roughened surface.

* * * * *